Feb. 8, 1966 H. S. YOURKE ET AL 3,234,398

TUNNEL DIODE BINARY COUNTERS

Filed Oct. 3, 1960 2 Sheets-Sheet 1

INVENTORS
HANNON S. YOURKE
ORVILLE R. LA MAIRE
WILLIAM G. STROHM

BY [signature]
ATTORNEY

Feb. 8, 1966 H. S. YOURKE ET AL 3,234,398

TUNNEL DIODE BINARY COUNTERS

Filed Oct. 3, 1960 2 Sheets-Sheet 2

3,234,398

TUNNEL DIODE BINARY COUNTERS

Hannon S. Yourke, Peekskill, and Orville R. La Maire and William G. Strohm, Yorktown Heights, N.Y., assignors to International Business Machines Corporation, New York, N.Y., a corporation of New York
Filed Oct. 3, 1960, Ser. No. 59,868
12 Claims. (Cl. 307—88.5)

This invention relates to binary counter circuits, and more particularly to binary counter circuits employing a semiconductor device exhibiting a forward biased engative resistance characteristic such as a tunnel diode.

The data processing industry has continually exerted an effort to improve the reliability of individual circuits and yet increase the speed at which the data is processed. To this end, the virtues of a device, popularly named the tunnel diode, has been utilized in different types of logical circuitry. The tunnel diode as described in an article appearing in the Physical Review for January, 1957, on pp. 603–604, entitled "New Phenomenon in Narrow Germanium P–N Junctions," by Leo Esaki is a P–N junction device, in which the junction is very thin, i.e. narrow, in the current accepted terminologey (on the order of 150 Angstrom units or less), and in which the semiconductor materials on both sides of the junction, have high impurity concentrations (of the order of $10^{-19}$ net donor or acceptor atoms per cubic centimeter for germanium).

The tunnel diode is characterized by a very low reverse impedance, approaching a short circuit, with a forward potential current characteristic exhibiting a negative resistance region beginning at a small value of forward potential (on the order of 0.05 volt) and ending at a large forward potential (of the order of 0.2 volt). The potential value at the low potential end of the negative resistance region is very stable with respect to temperature and does not vary over a range of temperatures of a value near 0° K. to several hundred degrees K. For potential values outside the limited range as described above, forward resistance of the tunnel diode is positive. For a further understanding of the structure and operational characteristics of the tunnel diode, reference is made to an article appearing in the Proceedings of the IRE, July 1959, pp. 1201–1206, entitled "Tunnel Diodes as High-Frequency Devices," by H. S. Sommers, Jr.

Because of the unique characteristics of the tunnel diode, it has been found experimentally that binary counter circuits employing a combination of a tunnel diode and a series connected inductor-resistor pair may be constructed capable of operating at very high repetition rates and employing a minimum of components.

The binary counters of this invention comprise a source connected to a first circuit including a tunnel diode and a second circuit comprising a resistor connected in series with an inductor. With the first and second circuits connected in parallel, the source biases these circuits to insure stable operation of the tunnel diode in both positive resistance regions. In one embodiment of this invention, a signal source of positive pulses is connected to the terminal of the circuit. For each input pulse provided by the signal source, the tunnel diode is switched from one stable operating state to another. Assuming, for instance, that the tunnel diode is operating stably in the positive resistance region at the high voltage end of its current-potential characteristic curve, a first pulse from the signal source switches the diode to the stable operating condition in the positive resistance region at the low voltage end of its characteristic curve. A second pulse of the same polarity as the first pulse from the signal source then switches the tunnel diode back to the previous stable operating state in the positive resistance region at the high voltage end of its characteristic curve. Thus, upon receipt of the second input pulse from the signal source, a positive voltage change is developed across the tunnel diode to provide the binary counting operation In this embodiment, it has been found that when a plurality of such circuits are connected in cascade, tolerances of the tunnel diode peak-to-valley ratio and its characteristic in the high voltage region become very stringent as do the tolerances on width of the pulses from the signal source.

In another embodiment of this invention, the signal source is connected intermediate the series connected resistor and inductor. In this embodiment, binary counter operation is achieved and it has been found that when the binary counter circuits according to this embodiment are connected in cascade, not only are the stringent requirements on the tunnel diode peak-to-valley ratio and the critical requirements of the tunnel diode characteristic in the high voltage region alleviated, but also the width tolerances of the pulses from the signal source are not stringent.

Accordingly, it is a prime object of this invention to provide novel binary counter circuits.

Another object of this invention is to provide improved binary counter circuits employing a semiconductor device exhibiting a forward bias negative resistance characteristic.

A further object of this invention is to provide improved binary counter circuits employing tunnel diodes.

Still a further object of this invention is to provide improved binary counter circuits employing tunnel diodes wherein the tolerance requirements on the peak-to-valley ratio of the tunnel diodes are not stringent.

Yet another object of this invention is to provide a circuit wherein a plurality of binary counters are connected in cascade through a coupling network.

Another object of this invention is to provide an improved circuit wherein binary counters employing a bistably operated tunnel diode are connected in tandem through coupling networks employing another tunnel diode biased for monostable operation.

The foregoing and other objects, features and advantages of the invention will be apparent from the following more particular description of preferred embodiments of the invention, as illustrated in the accompanying drawings.

Figure 1:
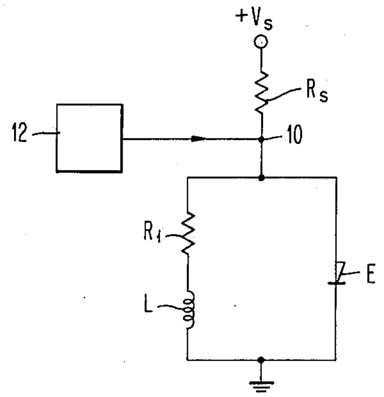
FIG. 1 is a schematic illustration of one embodiment of this invention.

Referring to the circuit of FIG. 1, an embodiment for a binary counter circuit according to this invention is shown wherein a tunnel diode E is connected in parallel with a circuit comprising a series connected resistor $R_1$ and inductor L. The parallel combination is energized by a current $I_s$ provided by a source $+V_s$ and resistor $R_s$ connected to a terminal 10. The circuit is also energized by a signal source 12 similarly connected to the terminal 10.

Figure 2:
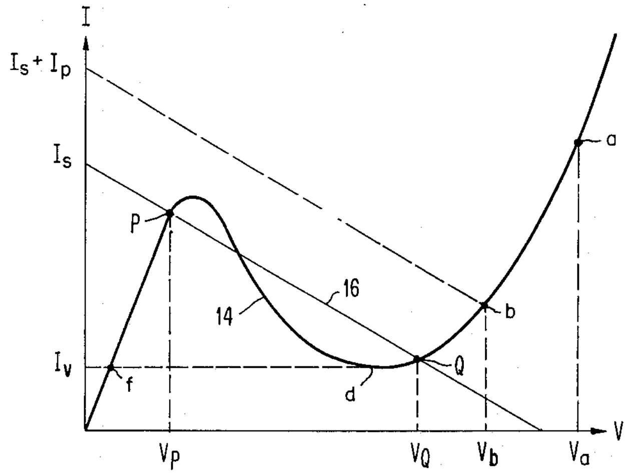
FIG. 2 illustrates the characteristic of the type semiconductor element employed in carrying out this invention.

The tunnel diode E of FIG. 1 has a current (I) versus potential (V) characteristic as is shown in FIG. 2. Referring to FIG. 2, a characteristic curve 14 of the diode E is shown describing a first region of positive resistance over a low range of potentials and adjoining at a peak current value a second region of negative resistance and thence a third region of positive resistance. With the source $+V_s$ providing the current $I_s$, a load line 16 is provided which intersects the characteristic curve 14 of the diode E at a point P, at voltage $V_p$, and a point Q, at voltage $V_Q$.

Figure 2A:
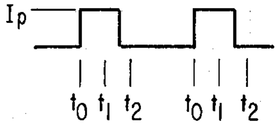
FIG. 2A is a diagram useful in understanding the operation of the embodiment of FIG. 1.

Referring to FIGS. 1 and 2, assuming the diode E is operating in the P stable state, upon operation of the signal source 12 the terminal 10 is energized by a current pulse $I_p$. All the current provided by source 12 initially flows through diode E causing it to move from point P on curve 14, to the right over the knee of the curve and jump to a point "*a*" in the third region at a voltage $V_a$. The current provided by source 12 is initially all drawn through the diode E since the inductor L resists any instantaneous change of current therethrough. After the diode E reaches the point "*a*," the current through the inductor L builds up while the current through the diode E decays until the pulse from source 12 is removed. If the pulse from source 12 has too long a time duration, the current through the inductor L will increase to a magnitude so as to cause the current through the diode E to fall below its valley current $I_v$ and switch the diode E back to the first positive resistance region. For instance, assuming the width of the input pulse from source 12 to be such that after switching of the diode E, the diode operates at point "*b*" on the curve 14, defined by a voltage $V_b$. If the input pulse from source 12 is now removed, the magnitude of this pulse must be delivered instantaneously to the circuit. However, inductor L opposes any instantaneous change in current and causes the diode E to move, on its characteristic curve 14, to the left from point "*b*" through point Q and below the valley current $I_v$, defined by a point "*d*." At this time, the diode E switches to a point "*f*" in the first positive resistance region of the curve 14 and thereafter returns to the stable operating state P. Thus, the duration of the pulse from source 12 must be maintained within a cretain boundary $t_0-t_1$ and $t_0-t_2$ as shown in FIG. 2A so that it is of a duration long enough to switch the diode E over the knee of the curve 14 but short enough to insure establishing the diode E in the Q stable state.

Assuming the diode E is operating in the Q stable state and the signal source 12 is operative to provide a positive current pulse to the terminal 10, again, initially all the current flows through the diode E causing operation thereof beyond the point "*b*." The current through the diode E then starts to decay while the current through the inductor L starts to build up until the pulse from signal source 12 is removed. Upon termination of the pulse from source 12, since the current through inductor L cannot change instantaneously, the current through diode E decreases by an amount necessary to maintain the current flowing through the inductor L. With this decrease in current sufficient to drop the current through the diode E below the point "*d*," the diode E switches to point "*f*" and thence to stable state P. In this case, a minimum input pulse width is required in order to guarantee that the current build up in the inductor L is sufficient to drop the current through the diode E below the point "*d*" when the pulse is removed. Referring to FIG. 2, it may be seen that with the load line 16 intersecting the curve 14 at the point Q, only a small change in current is necessary for this operation. The input pulses from the source 12 must then have a minimum and a maximum width in order to produce binary type action.

A close study of the circuit operation of FIG. 1 reveals that the current through the inductor L must build up sufficiently in order to switch the diode E from the Q to the P stable state after the input pulse is removed. Since the diode E is a rather low impedance in its high voltage region, i.e. between points Q and "*a*," only a very small voltage change occurs across the diode E when an input pulse is applied. With the resistor $R_1$ in series with the inductor L, the maximum change in current through the inductor is limited to the small change in voltage ($\Delta V$) that occurs due to the input pulse divided by the resistor $R_1$. Since $\Delta V$ will be small ($<.1$ volt) unless a very large input pulse amplitude is applied, this change in current through inductor L is small. Then when the input pulse is removed, only this small amount of current will be taken from diode E to maintain the current through inductor L. In order to guarantee that this decrease in current through diode E is sufficient to switch it below its minimum sustaining current $I_v$; to reset the diode E to stable state P, the stable state Q must be as close to the minimum sustaining current $I_v$ as is possible. This imposes stringent requirements on the diode peak-to-valley ratio as well as on the D.C. characteristic in the high voltage region. A slight shift in point Q results in either monostable operation where the only stable point is state P in FIG. 2, or the circuit remains in the high stable state Q, regardless of the input pulses.

Figure 3:
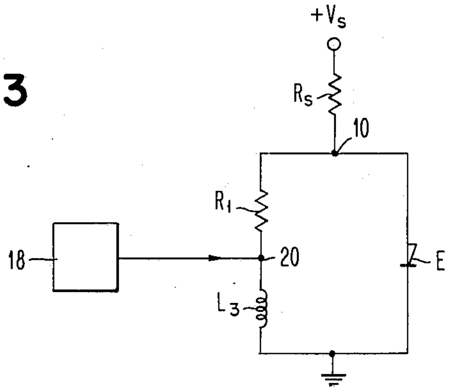
FIG. 3 is a schematic illustration of another embodiment of this invention.

Referring now to FIG. 3, another embodiment of a counter circuit according to this invention is shown which overcomes the difficulties discussed above with reference to the embodiment of FIG. 1. In FIG. 3, a similar circuit arrangement as shown in FIG. 1 is provided, but with a signal input source 18 connected to a terminal 20 intermediate resistor $R_1$ and inductor $L_3$. Assuming that the diode E is operating in the Q stable state, with the signal input source 18 operative to provide a positive current pulse to the terminal 20, initially all the current provided by this input pulse flows through the resistor $R_1$ and diode E to ground since the inductor $L_3$ opposes any instantaneous change in current therethrough. Thereafter, the current through $R_1$ and diode E decreases while the current through $L_3$ increases as was the case in the circuit of FIG. 1. Here, however, the amount of current through the inductor $L_3$ is limited by the input pulse width and not by the change of voltage at terminal 10 as in the case of the circuit of FIG. 1. With the pulse width sufficiently wide, almost all the input current flows through the inductor $L_3$ before the pulse terminates. This may be seen to be the case since $L_3$ becomes an effective short circuit after the initial transient. Upon termination of the input pulse from signal input source 18, the current through the diode E decreases by an amount necessary to keep the current through $L_3$ constant. Since the current through L is quite large, the current through diode E decreases below its minimum sustaining current $I_v$ to switch the diode E to stable state P. It may be seen that by connecting a signal input source 18 to point 20 intermediate the resistor $R_1$ and inductor $L_3$ the stable operating point Q may be raised higher on the curve 14, i.e. toward point "*a*," and still permit binary operation. The stringent requirements on the diode peak-to-valley ratio is thus minimized. In the circuit of FIG. 1, the peak-to-valley current ratio of the diode E must be held tightly within specified limits, while in the circuit of FIG. 3, the maximum ratio is of little concern. Further, the D.C. characteristics of the diode E in the high voltage region are not critical for the circuit of FIG. 3 as compared with that of FIG. 1 since the change in voltage at terminal 10 of FIG. 3 is not limiting the current increase through the inductor $L_3$ as is the case in FIG. 1.

Figure 4:
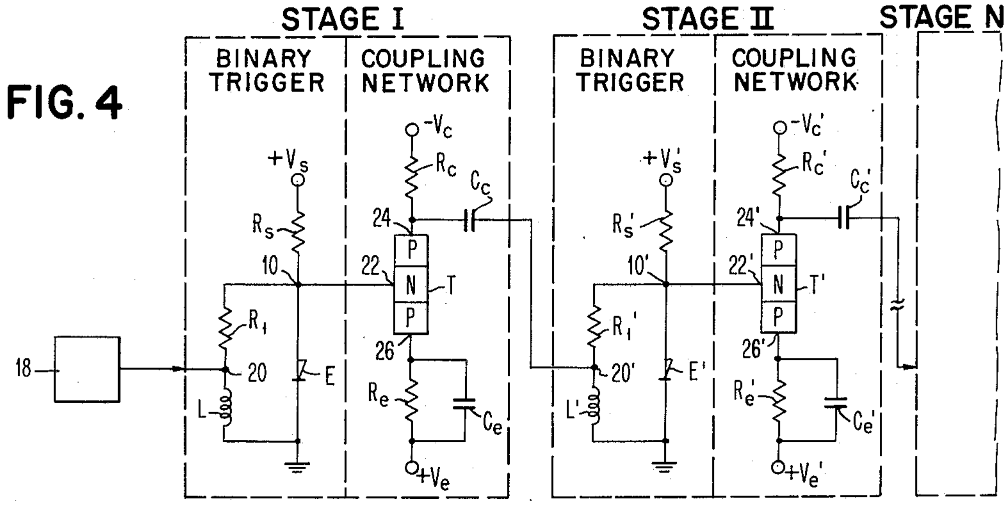
FIG. 4 illustrates still another embodiment of this invention.

Refering now to FIG. 4, a binary counter according to another embodiment of this invention is shown. In FIG. 4, Stage I and Stage II of an N stage binary counter are shown wherein each stage comprises the basic binary counter circuit of FIG. 3 and a coupling network. Since each binary counter employed in each stage operates as described with reference to FIG. 3, similar reference numerals and characters are employed for clarity. The binary counter circuit of each stage is connected to a coupling network, as stated above, comprising a PNP transistor T having a base electrode 22, a collector electrode 24 and an emitter electrode 26. The base electrode 22 of transistor T is connected to the terminal 10 of the binary trigger; the emitter electrode 26 is connected to the source $+V_e$ through a parallel circuit comprising a resistor $R_e$ and a capacitor $C_e$, while the collector electrode 24 is connected to the input terminal 20′ of the next stage through a coupling capacitor $C_c$ and also connected to a voltage supply $-V_c$ through a resistor $R_c$.

With the base electrode 22 of transistor T connected through diode E to ground, transistor T is forward biased in the steady state condition of the circuit. The emitter resistor $R_e$ is relatively large so that despite the forward biasing of transistor T, little current flows through transistor T in the steady state condition. Assuming that each of the diodes E of the stages I and II are in the P stable state and that the signal input source 18 is operative to provide a first positive pulse to the terminal 20 of the stage I, the diode E of stage I switches from the P stable state to the Q stable state. The change of state of diode E of stage I provides an increase in potential from voltage $V_P$ to voltage $V_Q$ at the terminal 10. Since transistor T is a PNP type with its base electrode 22 connected to terminal 10, the transistor T of stage I is cut-off during the transient due to the clamping action of capacitor $C_e$ and the transistor T is again forward biased at a time dependent upon the $R_e$–$C_e$ time constant. Thus, the first pulse from signal source 18 switches the diode E of stage I from the first stable state P to the second stable state Q providing no signal output to the second stage II.

Assuming the source 18 is again operative to provide a second pulse to terminal 20 of stage I, as described above with reference to the FIG. 3, the diode E switches back toward stable state P. The switching of diode E of stage I then provides a decrease of potential at terminal 10 from the voltage $V_Q$ to the voltage $V_P$. The drop in potential causes the base electrode 22 of transistor T to be negatively biased with respect to its emitter electrode 26 since the emitter electrode 26 is clamped at its initial value due to capacitor $C_e$. The transistor T of stage I is then forward biased and provides a positive pulse to the terminal 20′ of stage II through the coupling capacitor $C_c$. During this transient, the potential at the collector electrode 24 of transistor T is driven positive and returns to the potential $-V_c$ after the current flow through transistor T ceases. Upon energization of the terminal 20′ of stage II, the diode E′ thereof switches from the P to the Q stable state providing no output therefor as described above. Thus, for every two input pulses to the stage I, a single output pulse is provided which in turn conditions the stage II without providing an output signal therefrom.

Figure 5:
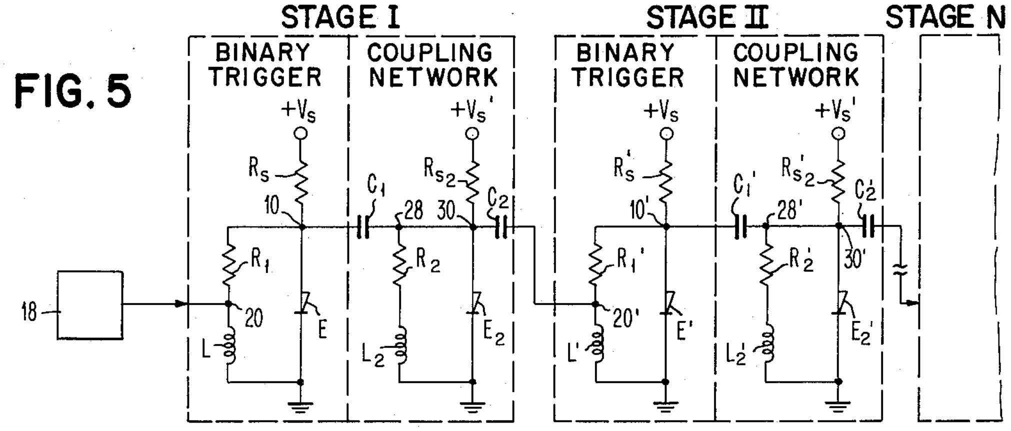
FIG. 5 illustrates yet another embodiment of this invention.

Referring now to FIG. 5, another embodiment of a binary counter circuit according to this invention is shown. There is provided in FIG. 5 a plurality of stages, the first two stages I and II of which are shown in detail, each of which comprises the basic binary trigger circuit of FIG. 3 connected to a coupling network. The coupling network consists of a capacitor $C_1$ connected to the terminal 10 of the binary trigger circuit and a terminal 28. The terminal 28 is connected to ground through a series resistor $R_2$ in series with an inductor $L_2$ and to a terminal 30. The terminal 30 is connected to a source $+V_s'$ through a resistor $R_{s2}$ and connected to ground through a diode $E_2$. The terminal 30 is also connected to the input terminal 20′ of the next succeeding stage of the counter through a capacitor $C_2$.

Figure 6:
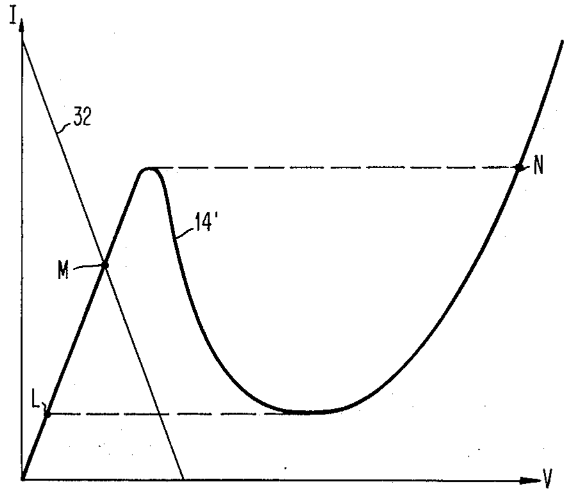
FIG. 6 illustrates the characteristic of a semiconductor element employed in FIG. 5.

Referring now to FIG. 6, a plot current (I) versus potential (V) is shown for the diode $E_2$ in FIG. 5, describing a characteristic curve 14′ similar to that of diode E. The source $V_s'$ and resistor $R_{s2}$ are so chosen as to provide a load line 32 as shown in the figure. The load line 32 intersects the curve 14′ of diode $E_2$ at a point M in the first positive resistance region to provide monostable operation of the diode $E_2$.

With reference to FIG. 5, assume that each of the diodes E of the different stages are in the Q stable state and the signal source 18 is operative to provide a first positive pulse to the input terminal 20 of stage I. The diode E of stage I then switches from the Q to the P stable state and in so doing provides a potential decrease, namely from voltage $V_Q$ to $V_p$, at the terminal 10. This decrease in potential has no effect other than to momentarily cause the diode $E_2$ to move from the stable operating stage M toward the left on its characteristic curve 14′. Upon operation of signal source 18 to provide a second positive pulse to the terminal 20 of stage I, the diode E of this stage now switches from the stable state P to the state Q. The diode E of stage I in switching provides an increase of potential, namely from $V_P$ to $V_Q$, at the terminal 10 causing current flow through capacitor $C_1$ to terminal 28. Since the inductor $L_2$ opposes any instantaneous change of current therethrough, the current to terminal 28 all flows through the diode $E_2$ causing the diode $E_2$ to switch from stable state M to a state N on the curve 14′. Since the load line 32 of FIG. 6 is such that no stable state exists for the diode $E_2$ in the high voltage portion of the curve 14′, the diode $E_2$ follows the curve 14′ to the left until a minimum valley current is reached and then switches to a point L in the first positive resistance portion of the curve and back to the stable operating state M. The rate at which the diode $E_2$ switches back to the M stable state is determined by the $L_2/R_2$ time constant. During the switching of $E_2$, a positive pulse is provided to the input terminal 20′ of stage II through the capacitor $C_2$, which switches the diode E′ thereof from the Q stable state to the P stable state. Thus, for every two input pulses to any one stage a single output pulse is provided to the next succeeding stage.

In the interest of providing a complete disclosure, details of one embodiment of the embodiment of FIG. 4 are given below, however, it is to be understood that other component values and current magnitudes may be employed with satisfactory operation attained so that the values given should not be considered limiting.

In the embodiment of FIG. 4, with the source $+V_s$ supplying 12 volts the resistor $R_s$ may have a value of 2.4K ohms, the resistor $R_1$ a value of 91K ohms, the inductor L being 6.8 microhenries while the diode E is a germanium tunnel diode having a five milliampere peak current value. Further, with the source $-V_c$ supplying a constant voltage of −6 volts and the source $+V_e$ supplying a constant voltage of +6 volts, the capacitor $C_e$ is 220 micro-microhenries, the resistor $R_e$ is 50K ohms, the resistor $R_c$ is 2K ohms, the capacitor $C_c$ is a 0.001 micro-microfarads with the transistor T being a germanium drift-transistor having an alpha ($\alpha$) cut-off in the range of 70 megacycles.

With the circuit constructed as set forth above, the input signal pulses may have a magnitude of 2 milliamperes, a width of approximately 50 millimicroseconds with a rise and fall time of approximately 15 millimicroseconds.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A binary counter comprising a semiconductor element exhibiting a short circuit stable current-potential characteristic curve defining a negative resistance region intermediate a first and a second positive resistance region, a resistive element and an inductive element, circuit means connecting the resistive element in series with said inductive element and in parallel with semiconductor element, a current source for biasing said circuit to cause stable operation of said semiconductor element in both said first and second positive resistance regions, and signal input means connected intermediate said resistive and inductive element selectively operable to provide a pulse of given polarity to said circuit for switching said element from one stable operating state to another.

2. A circuit comprising a first and a second semiconductor element each exhibiting a short circuit stable current-potential characteristic curve defining a region of negative resistance intermediate a first and a second region of positive resistance, means for biasing said elements for stable operation of said first element in both said first and second positive resistance regions and stable operation of said second element in only one of said positive resistance regions, signal input means for providing pulses of a same polarity to said circuit for alternately switching the stable operating state of said first element from said first to said second positive resistance regions, and means coupling said second element to said first element for causing said second element to traverse its characteristic curve in response to the switching of said first element from a predetermined one of its stable operating states to another.

3. A circuit comprising a first and a second semi-conductor element each exhibiting a short circuit stable current-potential characteristic curve exhibiting a negative resistance region intermediate a first and a second positive resistance region, means for biasing both said elements to cause stable operation of said first element in both positive resistance regions and stable operation of said second element in one of said positive resistance regions, a resistor and an inductor associated with each said element, signal input means for selectively delivering current pulses of a similar polarity, means connecting each said element in parallel with the associated resistor and inductor and series connecting the respective resistor and inductor, said last means further connecting said signal input means intermediate the resistor and inductor associated with said first element for alternately switching said first element from one stable operating state to another and actuating said second element in response to said first element switching from said one stable state to said other stable state.

4. A circuit comprising a first and a second tunnel diode, means for biasing said first diode for bistable operation and said second diode for monostable operation, signal input means for providing pulses of a same polarity to said circuit for alternately switching said first diode from a first to a second stable state, and means coupling said second diode to said first diode for actuating said second diode in response to said first diode switching from a predetermined one of said stable states to another.

5. A circuit comprising a plurality of cascaded stages, each said stage comprising a semiconductor element exhibiting a short circuit stable current-potential characteristic defining a region of negative resistance intermediate a first and second region of positive resistance, a resistive element and an inductive element, said resistive element connected in series with said inductive element and in parallel with said semiconductor element, means for biasing said semiconductor element for stable operation in both said positive resistance regions and means coupling the semiconductor elements of one stage of said circuit to a point intermediate the resistive and inductive elements of a next succeeding stage of said circuit.

6. In combination, a plurality of cascaded stages, each stage comprising a semiconductor element exhibiting a short circuit stable current-potential characteristic defining a negative resistance region intermediate a first and a second positive resistance region, a resistive element and an inductive element, circuit means connecting said resistive element in series with said inductive element and in parallel with said semiconductive element, means for biasing said circuit to cause stable operation of said semiconductor element in both said positive resistance regions; and means including monostable circuit means coupling the semiconductor element of each stage to an input terminal intermediate the resistive element and the inductive element of a succeeding stage.

7. A counter as set forth in claim 6, wherein said monostable circuit comprises another semiconductor element biased for stable operation in only one of the positive resistance regions.

8. A circuit comprising a plurality of cascaded stages, each stage comprising a semiconductor switching element exhibiting a short circuit stable current-potential characteristic defining a region of negative resistance intermediate a first and second region of positive resistance, a resistive element and an inductive element, means connecting said resistive element in series with said inductive element and in parallel with said semiconductor element, means for biasing said circuit to cause stable operation of said semiconductor element in both said positive resistance regions, and means including an electronic switching element coupling the semiconductor element of one stage of said circuit to an input terminal intermediate the resistive and inductive elements of the next succeeding stage of said counter.

9. The counter of claim 8, wherein said electronic switching element is a transistor having a base electrode connected to the semiconductor element of said one stage and a collector electrode connected to the input terminal of the next succeeding stage.

10. A binary counter comprising, in combination, a semiconductor element exhibiting negative resistance characteristics, circuit means including inductive means connected in parallel arrangement with said semiconductor element, said semiconductor element being biased for stable operation in a low voltage and a high voltage stable state, and means for applying successive input pulses of a same polarity and of selected duration to said parallel arrangement, said applying means and said inductive means cooperating to switch said semiconductor element between said low voltage and said high voltage stable states.

11. A binary counter as defined in claim 10 wherein said applying means is connected across said parallel arrangement.

12. A binary counter comprising, in combination, a semiconductor element exhibiting negative resistance characteristics, circuit means including inductive means and resistive means connected in tandem, said circuit means being connected in parallel arrangement with said semiconductor element, said semiconductor element being biased for stable operation in a low voltage and a high voltage stable state, and means connected at a point intermediate said inductive means and said resistive means for applying successive input pulses of a same polarity and of selected duration to switch said semiconductor element between said low voltage and said high voltage stable states.

References Cited by the Examiner

UNITED STATES PATENTS

| | | | |
|---|---|---|---|
| 2,944,164 | 7/1960 | Odell et al. | 307—88.5 |
| 2,986,724 | 5/1961 | Jaeger | 307—88.5 |
| 3,062,971 | 11/1962 | Wallace | 307—88.5 |
| 3,075,088 | 1/1963 | Li | 307—88.5 |
| 3,089,126 | 5/1963 | Miller | 307—88.5 |

ARTHUR GAUSS, *Primary Examiner.*

GEORGE N. WESTBY, JOHN W. HUCKERT, *Examiners.*